(12) United States Patent
Hsu et al.

(10) Patent No.: US 6,937,054 B2
(45) Date of Patent: Aug. 30, 2005

(54) PROGRAMMABLE PEAKING RECEIVER AND METHOD

(75) Inventors: Louis L. Hsu, Fishkill, NY (US); Karl D. Selander, Hopewell Junction, NY (US); Michael A. Sorna, Hopewell Junction, NY (US); William F. Washburn, Hyde Park, NY (US); Huihao H. Xu, Brooklyn, NY (US); Steven J. Zier, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/250,043

(22) Filed: May 30, 2003

(65) Prior Publication Data

US 2004/0239369 A1 Dec. 2, 2004

(51) Int. Cl.⁷ .......................... H03K 19/003

(52) U.S. Cl. ................... 326/30; 326/86; 326/126; 326/115; 326/127; 327/108

(58) Field of Search .................. 326/30, 86, 81, 326/83, 115, 126, 127; 327/108, 63, 52, 65, 165, 362, 563; 330/252, 260

(56) References Cited

U.S. PATENT DOCUMENTS

| | | |
|---|---|---|
| 5,661,395 A | 8/1997 | Johnson et al. |
| 5,721,485 A | 2/1998 | Hsu et al. |
| 5,825,169 A | 10/1998 | Selander et al. |
| 5,930,178 A | 7/1999 | Hsu et al. |
| 5,999,028 A * | 12/1999 | Knoch et al. ............... 327/165 |
| 6,236,524 B1 * | 5/2001 | Gregoire et al. ............ 360/46 |
| 6,300,804 B1 * | 10/2001 | Vadipour ..................... 327/63 |
| 6,356,114 B1 | 3/2002 | Selander |
| 6,466,100 B2 | 10/2002 | Mullgrav, Jr. et al. |
| 6,631,503 B2 | 10/2003 | Hsu et al. |
| 6,700,161 B2 | 3/2004 | Hsu et al. |
| 6,737,907 B2 | 5/2004 | Hsu et al. |
| 6,751,156 B2 | 6/2004 | Hsu et al. |
| 2002/0089381 A1 | 7/2002 | Mulgrav et al. |
| 2002/0092972 A1 | 7/2002 | Ames et al. |
| 2002/0133789 A1 | 9/2002 | Hsu et al. |
| 2002/0141219 A1 | 10/2002 | Hsu et al. |
| 2003/0008091 A1 | 1/2003 | Ullmann et al. |
| 2003/0052729 A1 | 3/2003 | Hsu et al. |

(Continued)

OTHER PUBLICATIONS

Lee, Thomas A. *The Design of CMOS Radio–Frequency Integrated Circuits*, 1998, pp. 179–187.

Primary Examiner—Vibol Tan
(74) Attorney, Agent, or Firm—Daryl K. Neff

(57) ABSTRACT

Methods and structures are disclosed herein for programmably adjusting a peaking function of a differential signal receiver. The disclosed method includes inputting a pair of differential signals to a pair of input transistors coupled to conduct currents differentially between a pair of load impedances and a pair of tail transistors. The impedance of an adjustable shunt impedance element between the tail transistors of the receiver is varied by programming signal input, such that higher current is conducted over a peaking range of frequencies. In a disclosed structural embodiment, an integrated circuit is provided having a programmable peaking receiver. The programmable peaking receiver includes a pair of input transistors coupled to conduct differentially according to a pair of differential inputs applied to the pair of input transistors. Each of the input transistors produces an output in accordance with the differential input applied thereto. The programmable peaking receiver also includes a pair of tail transistors, coupled to draw current from the input transistors, and a programmably adjustable impedance element coupled between current-conducting nodes of the tail transistors. The impedance of the programmably adjustable impedance element is thereby adjustable in response to programming signal input to adjust a peaking function of the programmable peaking receiver.

31 Claims, 8 Drawing Sheets

U.S. PATENT DOCUMENTS

| | | |
|---|---|---|
| 2003/0081447 A1 | 5/2003 | Hsu et al. |
| 2003/0128573 A1 | 7/2003 | Hsu et al. |
| 2003/0189903 A1 | 10/2003 | Hsu et al. |
| 2003/0189990 A1 | 10/2003 | Hsu et al. |
| 2003/0213998 A1 | 11/2003 | Hsu et al. |
| 2003/0228541 A1 | 12/2003 | Hsu et al. |
| 2004/0203899 A1 | 10/2004 | Curtis et al. |
| 2004/0207379 A1 | 10/2004 | Camara et al. |
| 2004/0209635 A1 | 10/2004 | Hsu et al. |
| 2004/0239369 A1 | 12/2004 | Hsu et al. |
| 2004/0251983 A1 | 12/2004 | Hsu et al. |
| 2004/0258166 A1 | 12/2004 | Camara et al. |
| 2005/0013355 A1 | 1/2005 | Smith |

* cited by examiner

PROGRAMMABLE PEAKING RECEIVER AND METHOD

BACKGROUND OF INVENTION

This invention relates to communication systems and more specifically to a system and method in which a receiver of an integrated circuit has a peaking function that is adjustable by varying one or more programming signal inputs to the receiver.

Data communication systems face many challenges today. The sizes of integrated circuit are being reduced rapidly, and data transmission speeds are increasing, requiring decreases in operating voltages and current levels, while signal losses increase over transmission media, and higher noise appears. The challenges are especially great in high speed serial data communications where high data transfer rates are required in difficult environments in which signals are highly attenuated over the communication channel and much noise is present due to cross-coupled interference ("cross-talk") among others. In addition, a transmitter or a receiver, as designed, may need to be capable of transmitting, or receiving, communications at multiple different transmission rates, depending on customer needs.

The maximum transmission rate and distance that data can be transmitted within a given communication system including a transmitter, transmission medium, and receiver are limited by jitter. Jitter is the tendency of data signal transitions to occur at different times during respective signal periods. While data signal receivers generally receive signals by sampling the input signal at the center of the period of an active signal at a time halfway between up and down signal transitions or halfway between down and up signal transitions, jitter introduces uncertainty to that determination, such that occasionally a data transition can occur at the time that coincides with the time that the input signal is sampled, thus causing the input signal to be sampled incorrectly. When a high amount of jitter is present, high data rate signals cannot be received reliably to keep bit error rates within tolerable limits. Jitter arises from a communication system in the following ways, among others. Jitter arises because insertion loss (i.e. the attenuation of a transmitted signal over a transmission medium) increases with frequency, causing signals to take longer to transition between levels, making it more difficult to receive higher frequency signals. Jitter also arises from attenuation which is due to signal reflection at one or both ends of the transmission medium, such as may arise from impedance mismatch between transmitter and transmission medium, or between receiver and transmission medium. Jitter may also be caused by inadequate control over the impedances of the transmitter and receiver, such as may arise from the impedance of an integrated circuit package.

In addition, jitter arises from signal attenuation due to inter-symbol interference (ISI), when irregular data patterns occur. Inter-symbol interference is best explained with reference to an example. Assume that a signal indicating a string of '1's, e.g., a continuously high voltage level for the duration of the '1's, is transmitted along a transmission medium. If within the string of all '1's a single '0' is transmitted, the amplitude of the single '0' is highly attenuated relative to the amplitude of the '1's, due to inter-symbol interference. The same is also true when a signal indicating a string of '0's, e.g., a continuously low voltage level for the duration of the '0's, is transmitted. If within the string of all '0's a single '1' is transmitted, the amplitude of the single '1' is attenuated due to inter-symbol interference.

Although many prior approaches have been used to help overcome signal integrity problems, each such approach is deficient in one way or another. Prior approaches are now presented, together with their deficiencies. One approach that has been used before to relieve high insertion loss of a signal over a transmission medium has been to increase the drive strength of the transmitter that drives the signal. For this purpose, transmitters can be provided with selectable current supply levels. A higher current supply to a transmitter increases its drive strength. Thus, with this approach a transmitter is operated with a higher selected current supply when it drives a longer, or more lossy transmission line. A serious drawback to this approach, which limits its ability to be utilized, concerns cross-coupled interference. The drive strength of the transmitter is limited to a level above which cross-coupled interference to closely situated devices becomes intolerable. Thus, the transmitter drive strength cannot be arbitrarily increased.

Another approach that has been used before to relieve frequency dependent signal attenuation, i.e. high frequency rolloff, which can contribute to ISI and jitter, has been to provide pre-emphasis in a transmitter by use of an equalizer. An equalizer allows the amplitude of specific frequencies or frequency ranges of a signal spectrum to be increased or reduced relative to each other, to provide pre-emphasis in a transmitter. An equalizer typically operates by convolving the signal, in either time or frequency domain, with a transfer function having adjustable coefficients. By selecting appropriate coefficients for performing pre-emphasis at the transmitter, high frequency rolloff of the transmitted signal at the receiving end, including ISI effects, can be counteracted. In digital communications, equalizers can take the form of a finite impulse response (FIR) filter. A FIR filter includes several shift registers, with each shift register containing information for the present data bit and other preceding and/or following data bits in the bit stream representing the signal. A transfer function is implemented through multiplication or convolution of the bit stream, including the present data bit and the preceding and/or following data bits, with the set of coefficients. For example, a transfer function of a FIR filter in the z domain, can be such as $H(z)=S [1+b1(z^{-1})+b2(z^{-2})+b3(z^{-3})]$, where b1, b2 and b3 are the coefficients which are stored in registers of the FIR, and S is a scaling factor. The coefficients are all negative, in order to provide pre-emphasis. The factors in determining values of the coefficients include the characteristics of the transmission medium, the speed of transmission, the type of board connect and package, etc. all of which play a role in determining the losses expected to be encountered.

Another way to implement pre-emphasis in a transmitter is described in U.S. Pat. No. 5,857,001 to Preuss. As described in that patent, a transmitter block includes an equalizer which functions to increase signal amplitude at signal transitions, with the increased signal amplitude at the transition decreasing with time thereafter with an exponential tail. While an approach such as that described in that patent can offset signal attenuation due to ISI in a transmission line, there are several significant drawbacks. For one, the driver is bulky, consuming much circuit area, and also consumes much power. In addition, the equalization is neither adjustable nor tunable, such that over or under-equalization at the transmitter end can actually cause jitter at the receiver end to exceed threshold. Another problem of performing equalization at the transmitter end is that it may not always solve problems that appear at the receiver end. This is because transmitter and receiver are manufactured on different chips provided by different vendors, such that a given receiver may or may not be connected to a transmitter that performs pre-emphasis. Therefore, it would be desirable to provide equalization in the receiver. In that way, the receiver can perform equalization of the incoming signal, regardless of the characteristics of the transmitter from which it receives the signal.

Equalization in the digital domain has been proposed for a receiver in U.S. Pat. No. 5,068,873 to Murakami. As described in that patent, a receiver is provided with a FIR type equalizer by which decisions are made at least partly based on feedback to the equalizer. During a calibration process, a sequence of test signals are processed through feed-forward and feed-backward FIR filters using a first algorithm having a fast convergence speed. Such is generally sufficient to tune the receiver to compensate for ISI over the transmission medium. By the end of the calibration process, a set of coefficients for the FIR filters is determined which provide good equalization for the transmitted signal. During normal operation, the receiver continuously tracks and monitors the transmission channel and variations in the chip temperature, and updates the coefficients in taps of the FIR through a second process, which operates somewhat more slowly. The disadvantages of using a FIR type equalizer are complicated design and operation, and high power overhead, i.e. the amount of power used to implement the FIR, as opposed to the power going into the received signal.

Yet another approach to compensating for frequency dependent signal losses at the receiver end originated conceptually in tuned peaking amplifiers developed during early television receiver research. Details of one such tuned peaking amplifier is described in The Design of CMOS Radio-Frequency Integrated Circuits, Thomas A. Lee (Cambridge University Press, Cambridge, UK, 1998), pp. 179–187. In a tuned peaking amplifier, the amplifier's gain is tuned by control over resistive, capacitive, and inductive elements at the time of design, such that an essentially flat frequency response is obtained over a relatively narrow frequency range of interest, while gain outside the frequency range of interest is allowed to be much lower. Tuned peaking amplifiers are used extensively in radio frequency (RF) wireless communications to provide selective amplification over narrow frequency bands of interest. Advantages of such amplifier designs include low power consumption, and low weight, making them attractive for use in portable RF devices.

The low power consumption and low weight of tuned peaking amplifiers also make them attractive for use as equalized receivers in high speed serial communications such as SerDes cores. SerDes cores are high speed serializer and deserializer blocks of an integrated circuit that provide high speed serial communication over relatively short links (generally less than 10 meters), such as for inter-system communication. However, the tuned peaking amplifier designs described above cannot be readily used in SerDes cores. This is because particular tuned receivers of the same SerDes core may each aim to receive different data rate signals, as determined by customer requirements. In such case, multiple different designs of tuned peaking amplifiers would have to be provided on the same SerDes core to provide this function. As SerDes cores form parts of chips including ASICs that can be installed in several different chip packages, each tuned receiver design may need further tuning for the chip to be installed a particular chip package. The tuned peaking amplifiers described above cannot be tuned after the time of design.

Therefore, it would be desirable to provide a tuned peaking amplifier for use as an equalized receiver, in which the sensitivity of the receiver over a particular frequency range of interest can be tuned by varying programming signal input to the receiver after the time of design.

SUMMARY OF INVENTION

Accordingly, a method and system are provided herein to programmably control the level of and frequency range over which receiver sensitivity is peaked, i.e. greatly increased over a portion of an input signal frequency range. Such method and system can be used, for example, to provide a receiver which compensates for signal loss in the transmission medium.

Methods and structures are provided herein for programmably adjusting a peaking function of a differential signal receiver. According to an aspect of the invention, a pair of differential signals is inputted to a pair of input transistors coupled to conduct currents differentially between a pair of load impedances and a pair of tail transistors. The impedance of an adjustable shunt impedance element between the tail transistors of the receiver is varied by programming signal input, such that higher current is conducted over a peaking range of frequencies.

According to another aspect of the invention, an integrated circuit is provided having a programmable peaking receiver. The programmable peaking receiver includes a pair of input transistors coupled to conduct differentially according to a pair of differential inputs applied to the pair of input transistors. Each of the input transistors produces an output in accordance with the differential input applied thereto. The programmable peaking receiver also includes a pair of tail transistors, coupled to draw current from the input transistors, and a programmably adjustable impedance element coupled between current-conducting nodes of the tail transistors. The impedance of the programmably adjustable impedance element is thereby adjustable in response to programming signal input to adjust a peaking function of the programmable peaking receiver.

According to another aspect of the invention, an integrated circuit is provided including a programmable peaking receiver, in which a pair of input transistors are coupled to conduct differentially according to a pair of differential inputs applied to the pair of input transistors. Each of the input transistors produces an output in accordance with the differential input applied thereto. According to this aspect, the programmable peaking receiver also includes a pair of tail transistors, coupled to draw current from the input transistors, and a pair of programmably adjustable load impedance elements operatively connected to the outputs of the pair of input transistors. The impedances of the programmably adjustable load impedance elements are thereby adjustable in response to programming signal input to adjust a peaking function of the programmable peaking receiver.

According to yet another aspect of the invention, an integrated circuit including a differential signal receiver is provided having a peaking function to increase receiver sensitivity over a limited range of signal frequencies. According to such aspect, the differential signal receiver includes a peaking circuit having a function to increase sensitivity of the differential receiver over a limited range of frequencies according to an amount of a first current drawn by the peaking circuit. The differential signal receiver also includes a non-peaking circuit, controlled according to an amount of a second current drawn by the non-peaking circuit, whereby the peaking function of the differential receiver is adjustable by varying relative magnitudes of the first current and the second current.

DETAILED DESCRIPTION

Exemplary systems and methods are described herein for programmably adjusting the peaking function of a signal receiver by one or more variable programming signal inputs provided to the receiver. In such manner, the peaking function can be adjusted "on the chip", i.e. after fabrication of the integrated circuit, such as for the particular conditions of a channel to which the receiver is coupled.

Figure 1:
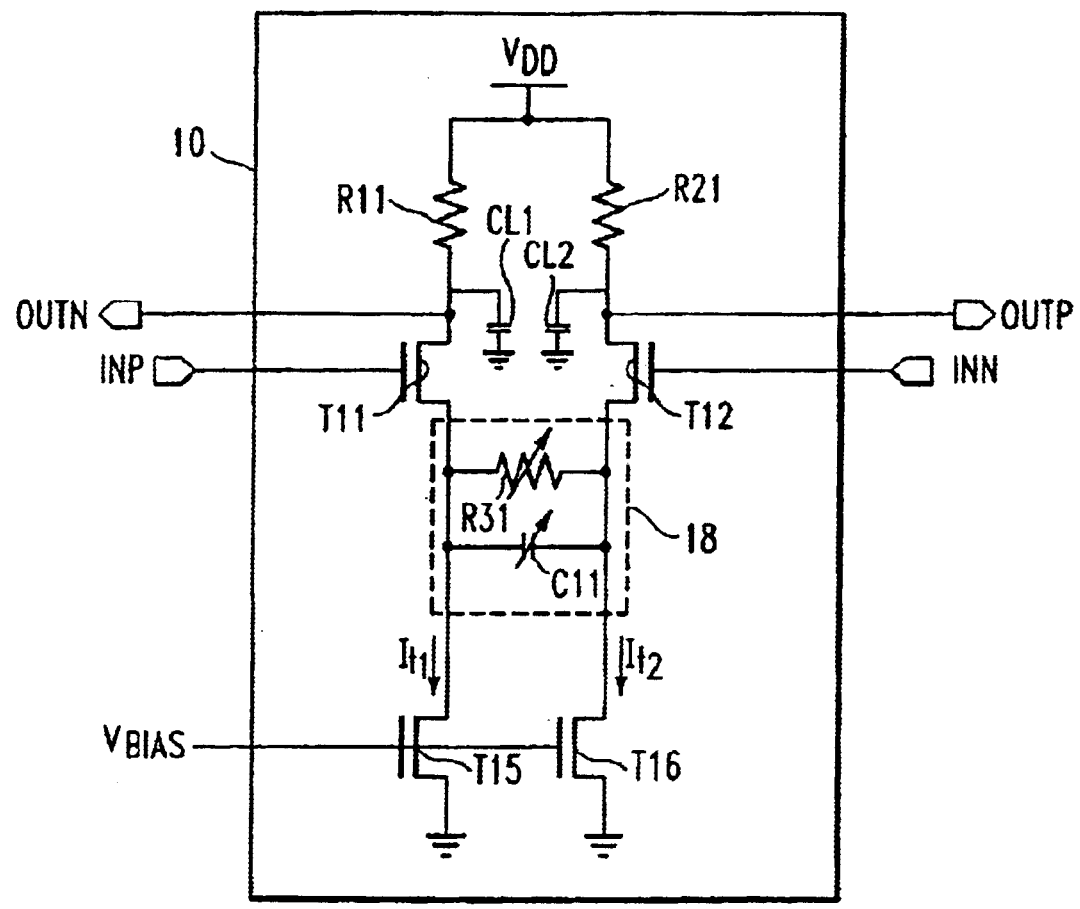
FIG. 1 is a schematic diagram illustrating a first embodiment of a programmable peaking receiver, having a programmably adjustable shunt impedance element.

A first embodiment of an on-chip programmable peaking receiver 10 is shown in FIG. 1. The receiver 10 is known as a "peaking" receiver because there is a strong peak in sensitivity over a relatively narrow range of frequencies: in this case, in the high frequency range of the signal spectrum. When a peaking receiver boosts sensitivity at high frequency relative to low frequency, it can help compensate for intersymbol interference (ISI), since a cause of ISI is high frequency roll-off of the signal spectrum input to the receiver, among others. A peaking receiver can also help suppress cross-talk noise, which includes interference arising from proximity to other transmitters and/or other receivers and signal lines, or which can be self-generated, e.g. as spurious harmonics of the signal. In addition, because a peaking receiver has increased sensitivity over a particular range of frequencies of interest, such peaking receiver can receive signals transmitted at lower transmission power. Lowered transmission power by itself helps reduce cross-coupled interference, as explained in the following example. When a transmitter is in communication with a particular peaking receiver, but is located in close proximity to another receiver, that transmitter can operate at a low transmission power and the particular peaking receiver with which it communicates still receives the signals adequately because of its peaking function. At the same time, the other receiver that is located in close proximity to that transmitter is not adversely affected, because of the low transmission power at which the transmitter is operated.

As will be understood from the following description, the peaking function of the receiver 10 is adjustable on the chip by signals provided thereto. As shown in FIG. 1, receiver 10 is a differential signal receiver that includes a pair of input transistors T11 and T12, to the gates of which differential voltages INP and INN representing a bit signal are applied. Transistors T11 and T12 are preferably field effect transistors (FET) having n-type conductivity, also known as NFETs. Each transistor of a pair of tail transistors T15 and T16, preferably NFETs, has a drain coupled to the source of an input transistor T11 or T12, respectively. The input transistors T11 and T12 differentially conduct between the output nodes OUTN and OUTP and the drains of transistors T15 and T16, respectively, according to the differential input voltages INP and INN presented to the gates of input transistors T11 and T12. In other words, when the input voltage INP is high, causing input transistor T11 to conduct, the output node OUTN is driven low. At the same time, the output node OUTP is driven high, because input transistor T12 is biased at an essentially nonconducting point by input signal INN. Conversely, when the input voltage INP is low, input transistor T11 is biased at an essentially nonconducting point, causing the output node OUTN to be high. At that time, output node OUTP is driven low because the input signal INN is high, causing input transistor T12 to conduct. Transistors T15 and T16 are known as "tail" transistors according to their placement and function within the receiver 10, since they are placed at the tail end of the receiver, coupled to ground, and they operate as pull-down transistors, pulling down constant current so that nodes at OUTN and OUTP will develop a voltage differential according to the current flow across load resistors R11 and R21. A voltage bias VBIAS, which is either constant or varying only slowly to compensate for change in operating conditions of the chip, e.g. temperature, is applied to tail transistors T15 and T16, such that under normal operation, the tail transistor T15 or T16 which is connected thereto operates in saturation mode.

A pair of load capacitances CL1 and CL2 are connected to the nodes OUTN and OUTP. As shown in FIG. 1, load capacitances CL1 and CL2 are lumped elements, which may include capacitances needed for impedance matching, as well as parasitic capacitances. Connected between the sources of NFET transistors T11 and T12 are an adjustable resistive element R31 and an adjustable capacitive element C11. The value of adjustable capacitive element C11 is selected such that at the low frequency range of the input signal, the capacitance C11 presents high impedance; whereas, at the high frequency range of the input signal, capacitance C11 presents low impedance. The sensitivity of receiver 10 therefore increases at high frequency because the low impedance path through adjustable capacitive element C11 to a tail transistor, e.g. transistor T16, increases the amount of current available to an input transistor, e.g. T11.

The peaking function of the receiver 10 is further alterable by programming signal input so as to compensate for the variability of load resistors R11, R21 and load capacitors CL1 and CL2. Such load resistors and load capacitors can vary in value, due to variations in the fabrication process, temperature and the supply voltage, as well as other conditions, under which the receiver 10 operates. The peaking function is alterable through programming signal input provided to adjustable resistive element R31 and adjustable capacitive element C11. For example, adjustable capacitive element C11 can be a voltage variable capacitor, alterable by a voltage bias input thereto.

Coupled between the drains of tail transistors T15 and T16 is an on-chip programmably adjustable impedance element 18, preferably including an adjustable resistive element R31, referred to by its placement and function in the receiver 10 as a "degenerating resistor" and an adjustable capacitive element C11 in parallel thereto. By appropriate control of the programmably adjustable impedance element 18 through programming signal input thereto, receiver 10 is adjusted for the specific frequency range and operating conditions for which it is being used. For example, if the frequency response of the transmission channel or the load impedances including load capacitances CL1 and CL2 attenuate high frequencies of interest relative to lower frequencies, the impedance of the adjustable capacitive element C11 can be tuned so as to boost the sensitivity of the receiver selectively to those high frequencies. When adjustable capacitive element C11 has been adjusted for a particular frequency range, its capacitance value is adjusted such that it presents much less impedance than the degenerating resistor R31 at frequencies in which load capacitors CL1 and CL2 begin to present somewhat less impedance than the load resistors R1 and R2. Stated another way, when the adjustable capacitive element C11 is properly adjusted, it provides a low impedance shunt at frequencies of interest. A preferred operating point for the impedance Z at frequencies of interest is determined where: $Z(R11 \times CL1)$ equals $Z(R21 \times CL2)$ equals $\frac{1}{2} Z(R31 \times C11)$.

In such case, a lowered impedance of impedance element 18 is needed at the high frequencies, in order to increase the pulldown current drawn by tail transistors T15 and T16 through one or the other of the load resistors R11 or R21 coupled to a turned on one of input transistors T11 and T12. For example, when the differential input voltages INP and INN at a particular time are high and low, respectively, transistor T11 will be turned on to a far greater degree than transistor T12, and the output voltage OUTN will be pulled down by the resistive voltage drop across resistor R11. The output voltage OUTP remains at or near the supply voltage VDD because transistor T12 conducts little current at that time, if at all. At that time, a pulldown current It1 is drawn by transistor T15. When the adjustable capacitive element C11 has reduced impedance at the high frequencies, the pulldown current at those frequencies is increased by the pulldown current It2 drawn by transistor T16. In addition, the impedance of the adjustable capacitive element C11 is lowered by increasing the capacitance, since the impedance Z of a capacitive element (e.g. C11) is inversely proportional to its capacitance, i.e. $Z(C)=1/j\omega C$.

In operation, receiver 10 is coupled to inputs INP and INN from a transmission line. Receiver 10 is biased at initial conditions, including programming signal inputs provided to adjustable resistive element R31 and adjustable capacitive element C11 of the adjustable impedance element 18. If it is determined that the frequency response of the receiver 10 is not optimum over frequencies of interest, then the programming signal inputs to the adjustable impedance element 18 are changed. For example, if high frequency response needs to be increased, the value of the adjustable impedance element 18 can be lowered by increasing the capacitance of the adjustable capacitive element C11, as the impedance is inversely proportional to the capacitance. Lowering the impedance of the adjustable capacitive element C11 increases the sensitivity at high frequency because higher AC current is drawn at those frequencies. Conversely, if the frequency response over a somewhat lower frequency range needs to be increased relative to higher frequencies, such as when lower data rate signals are to be received, then the resistance of the adjustable resistive element R31 is lowered by varying the control signals to adjustable impedance element 18.

Figure 2A:
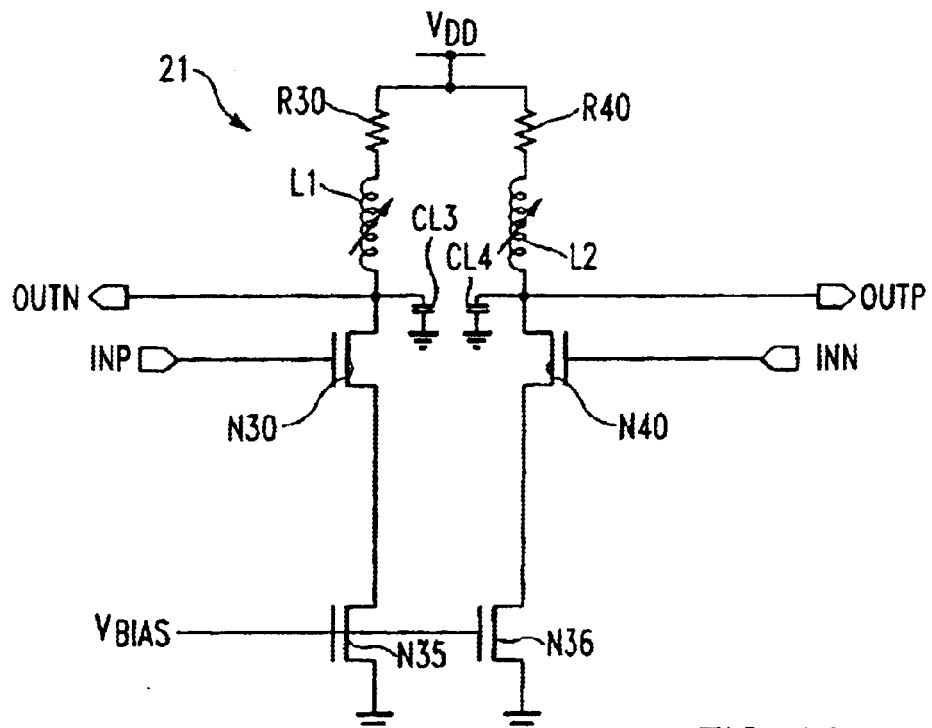
FIG. 2A is a schematic diagram illustrating a second embodiment of a programmable peaking receiver, having programmably adjustable load impedance elements.

A second embodiment of an on-chip programmable peaking differential signal receiver 21 is shown in FIG. 2A. In this embodiment, a pair of on-chip programmably adjustable inductive elements L1 and L2 are provided as load elements to enable the frequency peaking function of the receiver 21 to be adjusted. The impedance Z of an inductor varies directly with frequency, i.e. $Z(L)=j\omega L$. Therefore, adjustable inductive elements L1 and L2 present load impedances that increase with frequency, to counteract high frequency rolloff that occurs otherwise. For example, high frequency rolloff occurs due to load capacitors CL3 and CL4. Such load capacitors CL3 and CL4, which include, in part, parasitic capacitances arising during fabrication, have impedances ($1/j\omega C$) that become lower at high frequencies, thus reducing the voltage drop across the load, and thereby reducing the differential output voltages OUTN and OUTP. By making the inductive load elements L1 and L2 programmably adjustable, the receiver 21 can be tuned to compensate for variations which may occur either during the fabrication of the integrated circuit of which it forms a part, and for variations in the particular environment in which it is used, e.g. temperature and supply voltage, among others. Moreover, as will be described below, a programmably adjustable inductive element need not take up much area of the chip.

Note, as in the first embodiment described above, the receiver 21 includes a pair of input transistors N30 and N40 which receive a pair of differential input voltages INP and INN which represent a bit signal, respectively. These input transistors N30 and N40 produce differential output signals at nodes OUTN and OUTP, according to the states of the input voltages INP and INN provided thereto. As in the first embodiment, the receiver 21 includes a pair of load resistors R30 and R40, one coupled to a left side of the receiver 21, and the other coupled to the right side, respectively. Also, as in the first embodiment, receiver 21 includes a pair of tail transistors N35 and N36 which are conductively coupled to the input transistors N30 and N40, respectively.

In operation, receiver 21 is coupled to inputs INP and INN from a transmission line. Receiver 21 is biased at initial conditions, including programming signal inputs provided to the adjustable impedance elements, including adjustable inductive elements L1 and L2. Since the impedance Z of an inductor varies directly with frequency, i.e. $Z(L)=j\omega L$, the adjustable inductive elements L1 and L2 help increase the higher frequency sensitivity of the receiver 21 over the sensitivity at lower frequencies. This may be necessary, in view of the operating frequency selected for the receiver 21 and the presence of load capacitors CL3 and CL4, which tend to reduce the sensitivity of receiver 21 at high frequencies. If it is determined that the frequency response of the receiver 21 is not optimum at frequencies it is required to operate, then the programming signal inputs to the adjustable inductive elements are changed. For example, if the high frequency response needs to be increased in the receiver, the inductances of the adjustable inductive elements L1 and L2 are increased, the programming signal inputs provided to receiver 21. Doing so boosts the high frequency sensitivity of receiver 21 because the higher inductance of L1 and L2 increases the voltage drop between the supply voltage VDD and the output nodes OUTN and OUTP. However, if the high frequency response needs to be decreased, e.g. as when lower data rate signals are to be received, then the inductances of the adjustable inductive elements L1 and L2 are decreased by changing the programming signal inputs to receiver 21.

Figure 2B:
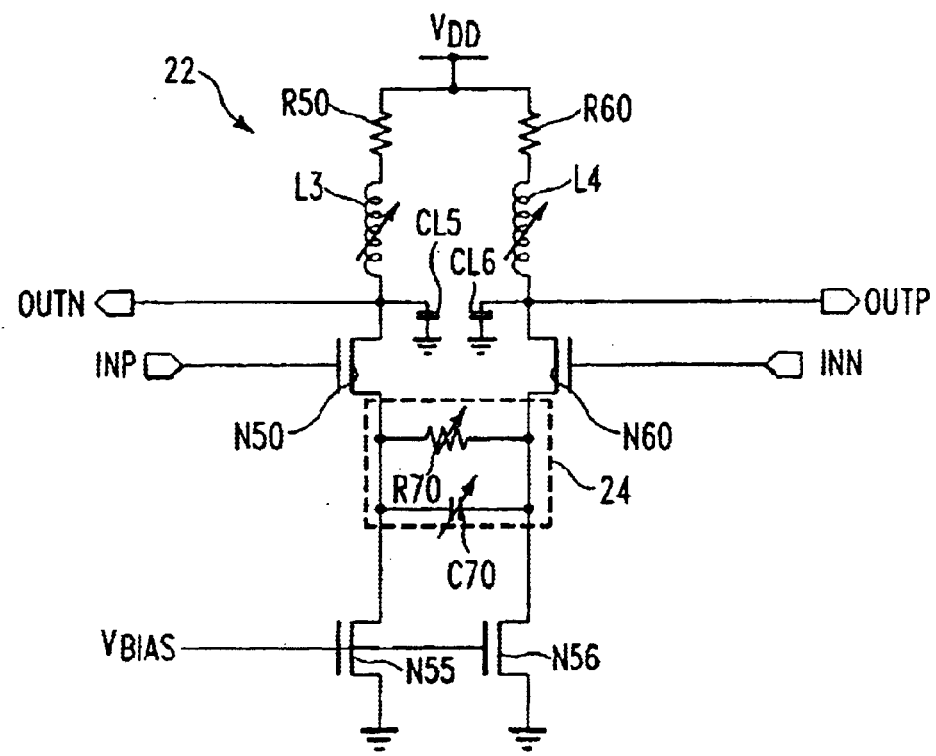
FIG. 2B is a schematic diagram illustrating an alternative version of a second embodiment of a programmable peaking receiver, having programmably adjustable load impedance elements and a programmably adjustable shunt impedance element.

An alternative version of the above embodiment is illustrated in FIG. 2B as the on-chip programmable peaking differential signal receiver 22. In this signal receiver 22, in addition to having circuit components which correspond to those of signal receiver 21 (FIG. 2A), an additional programmably adjustable shunt impedance 24 is provided, coupled between current conducting nodes of the tail transistors N55 and N56. The purpose of the adjustable shunt impedance 24 is to provide additional tunability in conjunction with adjustable inductive elements L3 and L4, to produce a more precisely tunable frequency response. The adjustable shunt impedance 24 may include, for example, a variable capacitor C70 coupled, as shown, in parallel with a variable resistor R70, or may instead include a variable capacitor C70 coupled in parallel with a fixed resistance, or may even include only a variable capacitor C70. While adjustable inductive elements L3 and L4 are adjusted to increase sensitivity over a certain range of frequencies, e.g. the high frequency range, the adjustable shunt impedance 24 can adjust the ratio of the high frequency sensitivity to the low frequency sensitivity. Such sensitivity adjustments are usually necessary to compensate for inter-symbol interference, the effects of which may not be known a priori at the time the receiver 22 is fabricated. The provision of both adjustable inductive elements L3, L4 and the adjustable shunt impedance element 24 also make it possible to use one adjusting mechanism, e.g. adjustable inductive elements L3, L4, for coarse tuning, and the second tuning mechanism, e.g. adjustable shunt impedance element 24, for fine tuning.

Figure 2C:
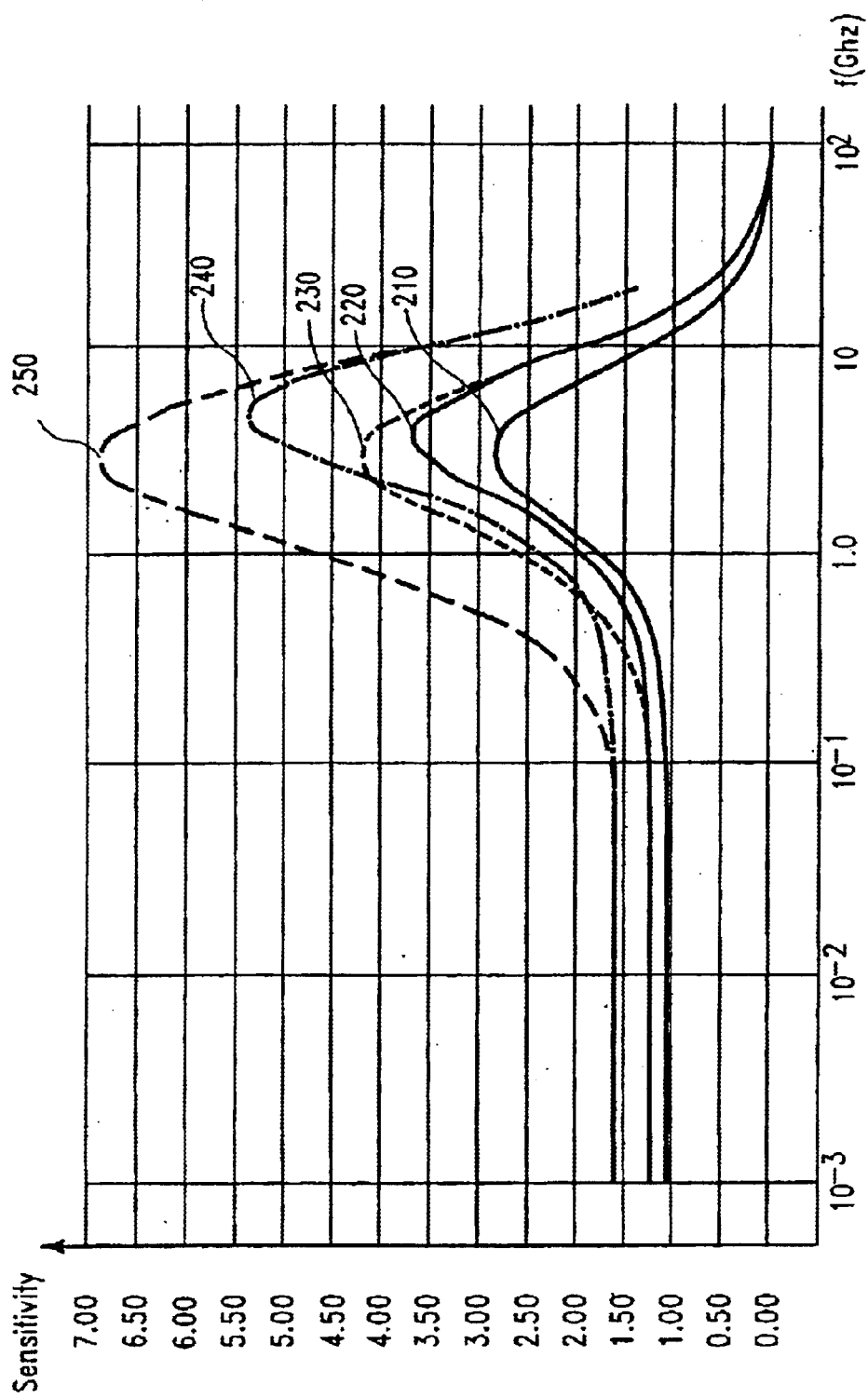
FIG. 2C is a diagram illustrating sensitivity of a programmably adjustable peaking receiver for a variety of conditions.

FIG. 2C is a graph illustrating a calculated estimation of the sensitivity (Vout/Vin) of the receiver 22 over a range of frequencies for different "process corners" to which the integrated circuit may be subjected during fabrication. For example, "slow process corner" indicates a fabrication process, marginally within process tolerances, which is calculated to have the greatest effect in lowering the speed of the receiver 22. "Nominal corner" indicates the nominal fabrication process, and "fast corner" indicates the fabrication process that increases the speed of the receiver 22 the most while still being within process tolerances. Referring again to FIG. 2B, in general, tuning of the receiver 22 is a two-step process. First, the adjustable inductive elements L3 and L4 are adjusted to increase high frequency sensitivity. Thereafter, the adjustable shunt impedance element 24 is adjusted to set the ratio of high frequency to low frequency sensitivity within receiver 22. During this process, the sensitivity at the peaking frequency of the receiver is increased or decreased to a proper setting. In addition, the peaking frequency may be moved either to the left or to the right on the frequency scale. Thus, as shown in FIG. 2C, curve 210 indicates the sensitivity of the receiver 22 fabricated according to slow process corner, after tuning the adjustable inductive elements L3, L4 and/or adjustable shunt impedance element 24. Curve 220 indicates the sensitivity of the receiver 22 fabricated according to nominal process corner, after adjustable inductive elements L3 and L4 may have been adjusted, but before the adjustable shunt impedance element 24 has been adjusted. Under such condition, the peaking frequency of the untuned receiver 22 is 3.85 GHz. Curve 230 indicates the sensitivity, at nominal process corner, after the adjustable shunt impedance element 24 is adjusted to optimize sensitivity. As evident by comparing curve 230 to curve 220, the sensitivity is increased, while the particular peaking frequency is lowered in FIG. 2C, to 3.2 GHz. Finally, curve 240 shows the sensitivity of the receiver 22 at the fast process corner, prior to adjusting the adjustable shunt impedance element 24. Under such condition, the peaking frequency is 5.0 GHz and the peak sensitivity is 5.4. Thereafter, the adjustable shunt impedance element 24 is adjusted to lower the peaking frequency to 3.2 GHz, while the peak sensitivity increases to 6.8.

Figure 2D:
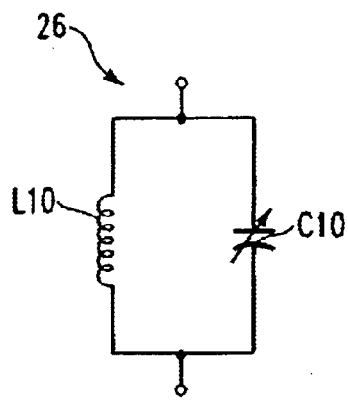
FIGS. 2D and 2E illustrate prior art circuits for providing a variable inductive element.
Figure 2E:
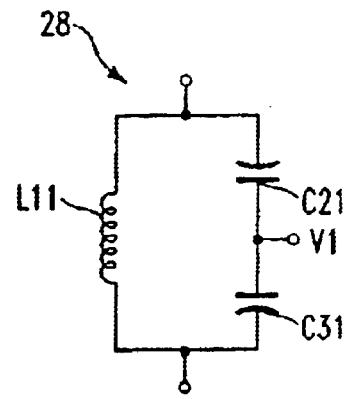

Adjustable inductive elements L1 and L2 of FIG. 2A, and adjustable inductive elements L3 and L4 of FIG. 2B can be implemented according to any of several ways. However, because the adjustable inductive elements must have small size and are preferably implemented on the integrated circuit itself, it is preferable to use inductors of fixed inductance together with other elements to achieve an adjustable impedance element having a programmably adjustable inductance. Thus, as shown in FIG. 2D, an adjustable inductance element 26 having a fixed inductor L10 may be provided, coupled in parallel with a voltage variable capacitor C10. FIG. 2E illustrates a known way of implementing an equivalent adjustable impedance element 28 using only fixed capacitors. Thus, two or more capacitors C21 and C31, having a common terminal connected to a control voltage input V1, have equivalent function to the voltage variable capacitor shown in FIG. 2D. A formula for the equivalent inductance of the arrangements provided in FIGS. 2D and 2E is as follows: $L_{eq}=L/(1-\ddot{\mathrm{I}}\square^2 LC)$.

The arrangements shown in FIGS. 2D and 2E permit inductances to be achieved that are larger than the inductance of the fixed inductor portion of the circuit. As an example, when f=1 GHz, an equivalent inductance of 4 nH can be obtained with a fixed inductor having a value of only 0.8 nH and capacitors C21 and C31 having values of 25 pF, with a proper voltage V1 applied.

Figure 3:
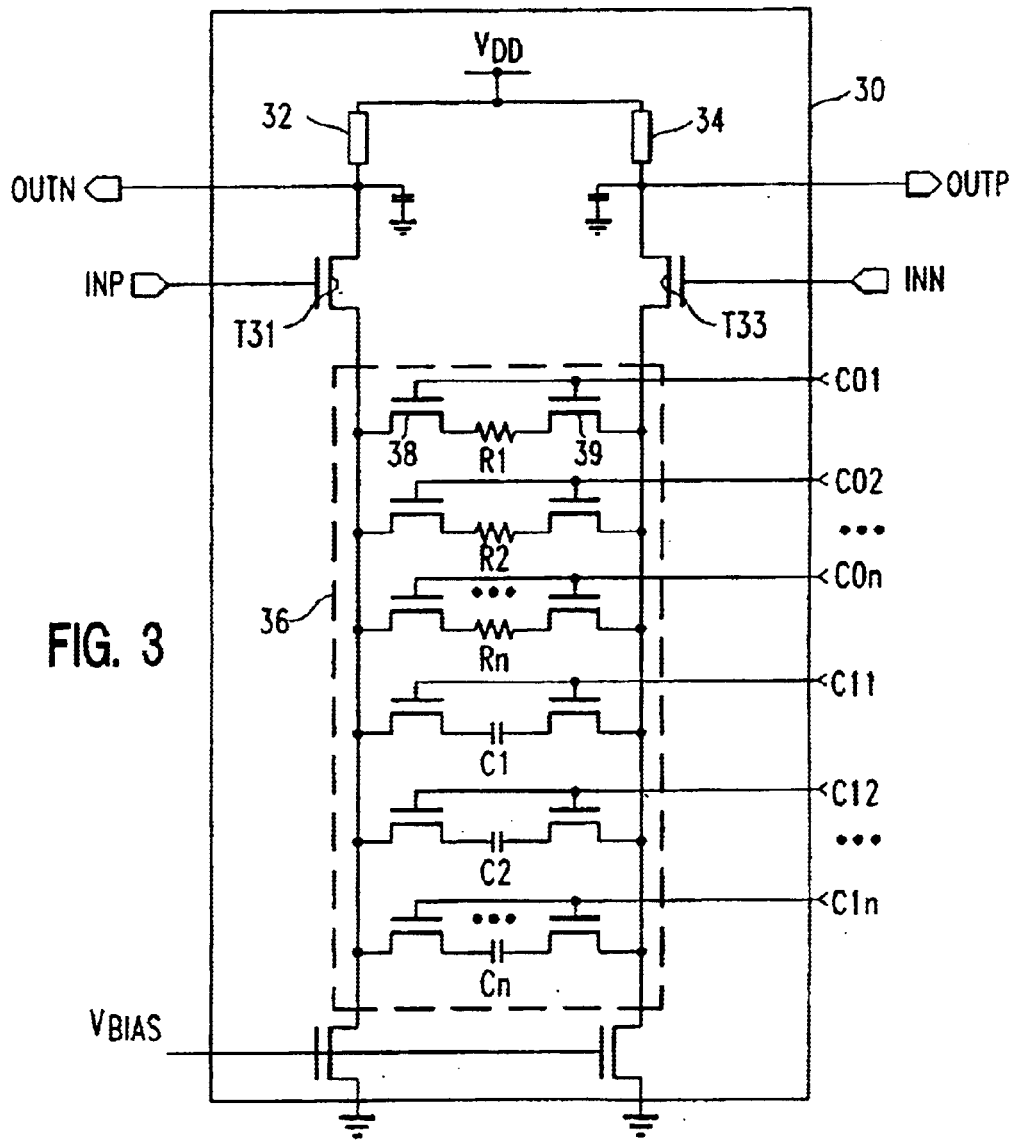
FIG. 3 is a schematic diagram illustrating an embodiment of a programmable peaking receiver, including a particular arrangement for varying the resistance and capacitance of an adjustable impedance element.

FIG. 3 illustrates an embodiment of a receiver 30 having either fixed or adjustable load impedances 32 and 34, which may either be purely resistive, or may involve inductive and/or capacitive portions, such as those shown and described above with reference to FIGS. 1 and 2A through 2D. In this embodiment, an adjustable impedance element 36, coupled in shunt configuration between input transistors T31 and T33, is made up of a plurality of resistive elements R1, R2, . . . Rn, and capacitive elements C1, C2, â□Cn. Control over the value of the adjustable impedance element 36 is provided through a set of control signals C01, C02, â□C0n, and C11, C12, â□C1n, each control signal being coupled to operate a pair of transistors, e.g. transistors 38 and 39, to select whether a particular element, e.g. resistor R1, is conductively connected between conductive terminals (the sources) of transistors T31 and T33. Through such arrangement, adjustable impedance can be achieved using only elements having fixed resistances and fixed capacitances. With appropriate selection of values of resistive and capacitive elements of receiver 30, it is possible to finely tune the impedance of adjustable impedance element 36 through use of only binary control signals, rather than having to generate multi-level or analog control signals.

Figure 4A:
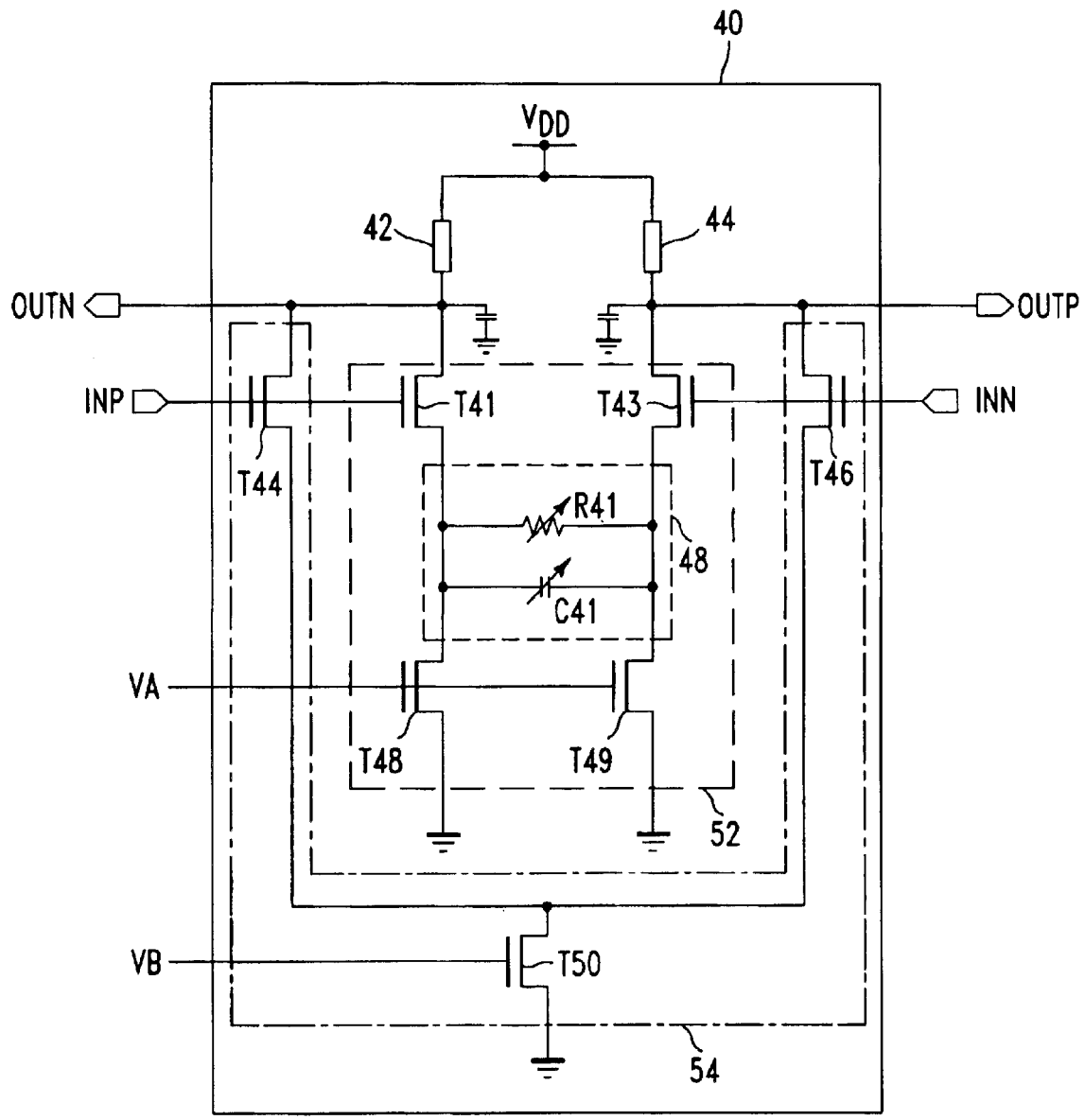
FIG. 4A is a schematic diagram of a further embodiment of a programmable peaking receiver having a peaking circuit and a non-peaking circuit, for programmably varying the peaking function of the receiver according to the relative magnitudes of operating currents of the peaking circuit and non-peaking circuit.

FIG. 4A illustrates another embodiment of a receiver 40. In this embodiment, a receiver 40 for receiving differential signals includes both peaking and non-peaking portions which cooperate to adjust the amount of the peaking function of the receiver 40 according to the relative amounts of current that each portion draws. Through such arrangement, the peaking function of the receiver 40 can be adjusted on the chip to compensate for conditions, e.g. loading, temperature and process variations, as well as frequency characteristics of the signal itself.

As shown in FIG. 4A, as in the above-described embodiments, receiver 40 includes a pair of transistors T41 and T43, preferably NFETs, to which the differential signals INP and INN are applied as input, respectively, from a differential transmission line. The differential outputs OUTN and OUTP of the receiver 40 are taken at the drains of the transistors T41 and T43. The differential outputs OUTN and OUTP are determined by the voltage drops across the load impedances 42 and 44 from the supply voltage VDD. Load impedances 42 and 44 can include resistive elements, alone or in combination with inductive elements or elements having adjustable inductance, as described above relative to FIGS. 2A through 2D.

Transistors T41 and T43 form part of a peaking circuit 52 which includes tail transistors T48 and T49 coupled thereto, and an adjustable impedance element 48, connected as a shunt between the source terminals of transistors T41 and T43. A bias voltage VA, applied at the gates of tail transistors T48 and T49, determines the amount of current drawn by the tail transistors T48 and T49. By varying the bias voltage VA, the amount of current drawn by the peaking circuit is varied, thereby varying the degree to which the receiver 40 is operated as a peaking receiver.

Similar to the embodiment described above relative to FIG. 1, the adjustable impedance element 48, having a resistive element R41 and a capacitive element C41, functions to increase sensitivity of the receiver 40 over a limited range of frequencies that occurs at the high end of the input signal spectrum. The impedance element 48 can have either fixed or adjustable impedance, as follows. Resistive element R41 can have either fixed resistance, or more preferably, resistance which is adjustable by programming signal input, as in the embodiments described above relative to FIGS. 1 through 3. Capacitive element C41 can also have fixed capacitance, or more preferably, capacitance which is adjustable by programming signal input, also as in the embodiments described above relative to FIGS. 1 through 3.

Connected in parallel to the peaking circuit 52 is a non-peaking circuit 54. In an embodiment, this non-peaking circuit 54 need not include more than a pair of transistors T44 and T46, preferably NFETs, to which differential signals INP and INN are applied as inputs, respectively, and a tail transistor T50 (preferably an NFET) coupled to the source terminals of transistors T44 and T46. A bias voltage VB, applied to the gate of tail transistor T50, determines the amount of current drawn by the non-peaking circuit. As will be understood, by varying the bias voltage VB, the amount of current drawn by the non-peaking circuit is varied, thereby varying the degree to which the receiver is operated as a non-peaking receiver.

In operation, a pair of differential signals INP and INN is applied to the receiver 40 at the peaking circuit 52 and the non-peaking circuit 54, which is connected in parallel to the peaking circuit 52. Thus, differential signals INP and INN are applied at the gates of transistors T41 and T43, respectively, of the peaking circuit 52, and at the gates of transistors T44 and T46, respectively, of the non-peaking circuit 54. The relative amount of peaking performed by receiver 40 is controlled by varying the bias voltage VA applied to the gates of tail transistors T48 and T49 to vary the amount of the current drawn by tail transistors T48 and T49; and by varying the bias voltage VB applied to the gate of T50 to vary the amount of current drawn by transistor T50. The amount of peaking function performed by receiver 40 is thereby adjustable to different levels. For example, 50% peaking can be achieved when bias is applied such that the tail transistors T48 and T49 of the peaking circuit 52 and the tail transistor T50 of the non-peaking circuit 54 both draw the same amount of current. In such manner, the voltage drops across load impedances 42 and 44 are determined by the currents drawn by both the tail transistors T48, T49 of the peaking circuit and the tail transistor T50 of the non-peaking circuit. This might be needed to better recover lower frequencies of the differential input signal, as when the received signal is transmitted at less than the maximum data rate. On the other hand, when maximum peaking is desired, the bias voltage VB can be set to zero to stop the non-peaking circuit 54 from operating. In such case, bias voltage VA is set to a level at which a current is drawn by the peaking circuit 52 to optimize peaking over a certain frequency range, which will typically be at the high end of the input signal frequency range. In such case, receiver 40 is operated at 100% peaking. In this way, many levels of peaking, from 0% to 100%, can be attained by applying appropriate bias voltages VA and VB to the peaking and non-peaking circuits of receiver 40.

Within peaking circuit 52, the peaking operation of receiver 40 is determined primarily by the impedance presented by impedance element 48. When the impedance element 48 includes adjustable impedance elements, for example, such as any of the adjustable impedance elements 18, L1 â□L4, 24, or 36 of the embodiments described above relative to FIGS. 1 through 3, one or more programming signal inputs are provided to the impedance element 48 to adjust the peaking center frequency and magnitude of peaking within the peaking circuit 52.

Figure 4B:
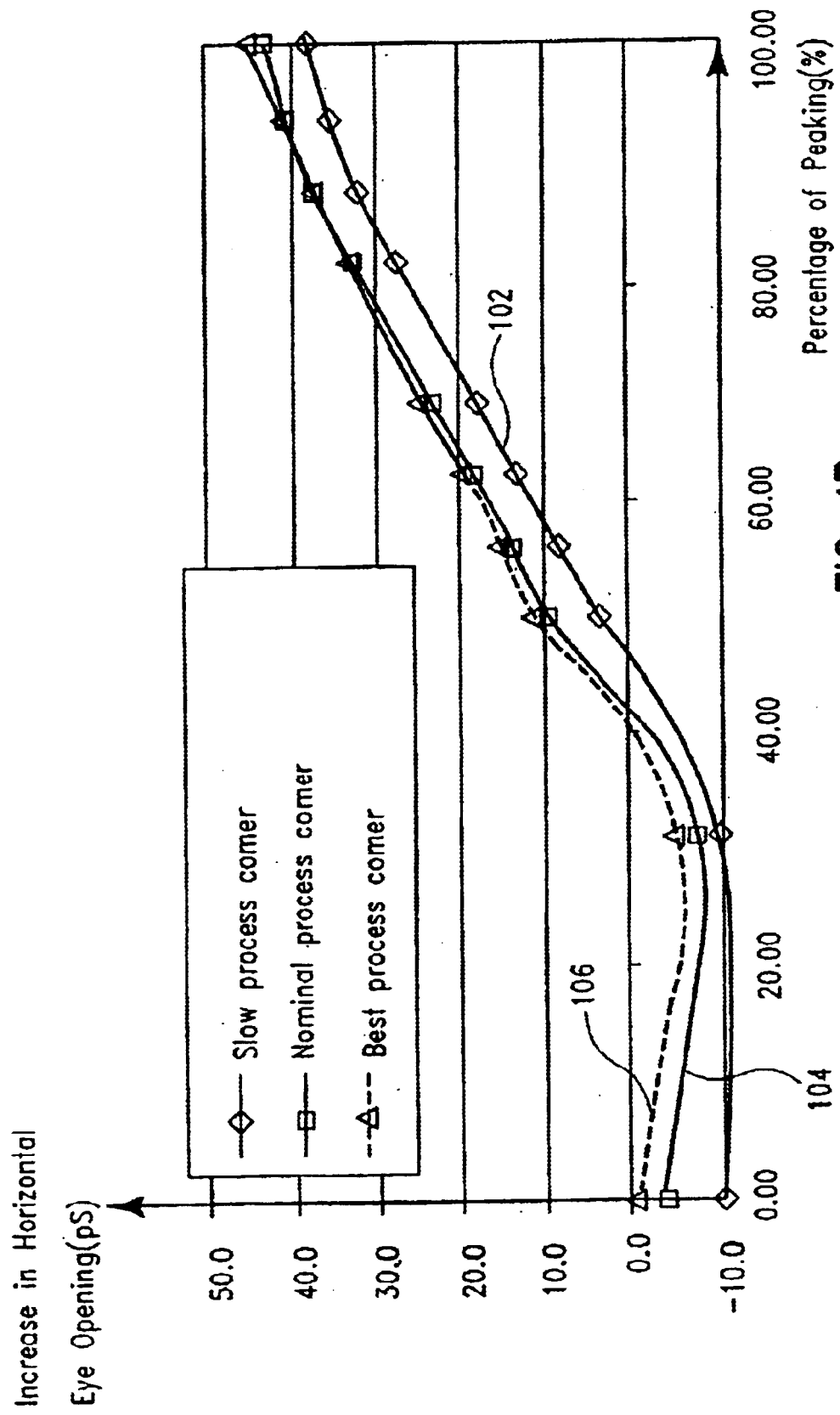
FIG. 4B is a graph of a mathematical simulation illustrating an increase in horizontal eye opening of a signal to be received relative to the percentage of peaking at which a receiver according to the embodiment of FIG. 4A is operated.

FIG. 4B is a graph of a mathematical simulation illustrating the jitter tolerance of receiver 40. FIG. 4B illustrates the net increase in the horizontal eye opening of the input signal, the input signal being represented by the differential input signals INN and INP, as a function of the percentage that the peaking circuit 52 of the receiver 40 is operated, relative to the total operation of receiver 40 including the peaking circuit 52 and the non-peaking circuit 54. As shown in FIG. 4B, the horizontal eye opening increases monotonically, as the percentage of peaking is increased in the range between about 30% and 100%. The results of mathematical simulations are shown for three cases: a slow process corner 102, for which variables in the fabrication process of an integrated circuit including receiver 40 are set at the worst conditions within tolerances for the speed of the receiver 40; a nominal process corner 104, for which variables in the fabrication process are set at nominal conditions; and a best process corner 106 in which variables in the fabrication process are set at their best conditions. It is apparent from FIG. 4B that increasing the percentage that the peaking circuit of the receiver 40 is operated increases the net horizontal eye opening of the input signal. Stated another way, when the receiver 40 is operated at a higher percentage of peaking, improved jitter tolerance results.

Figure 4C:
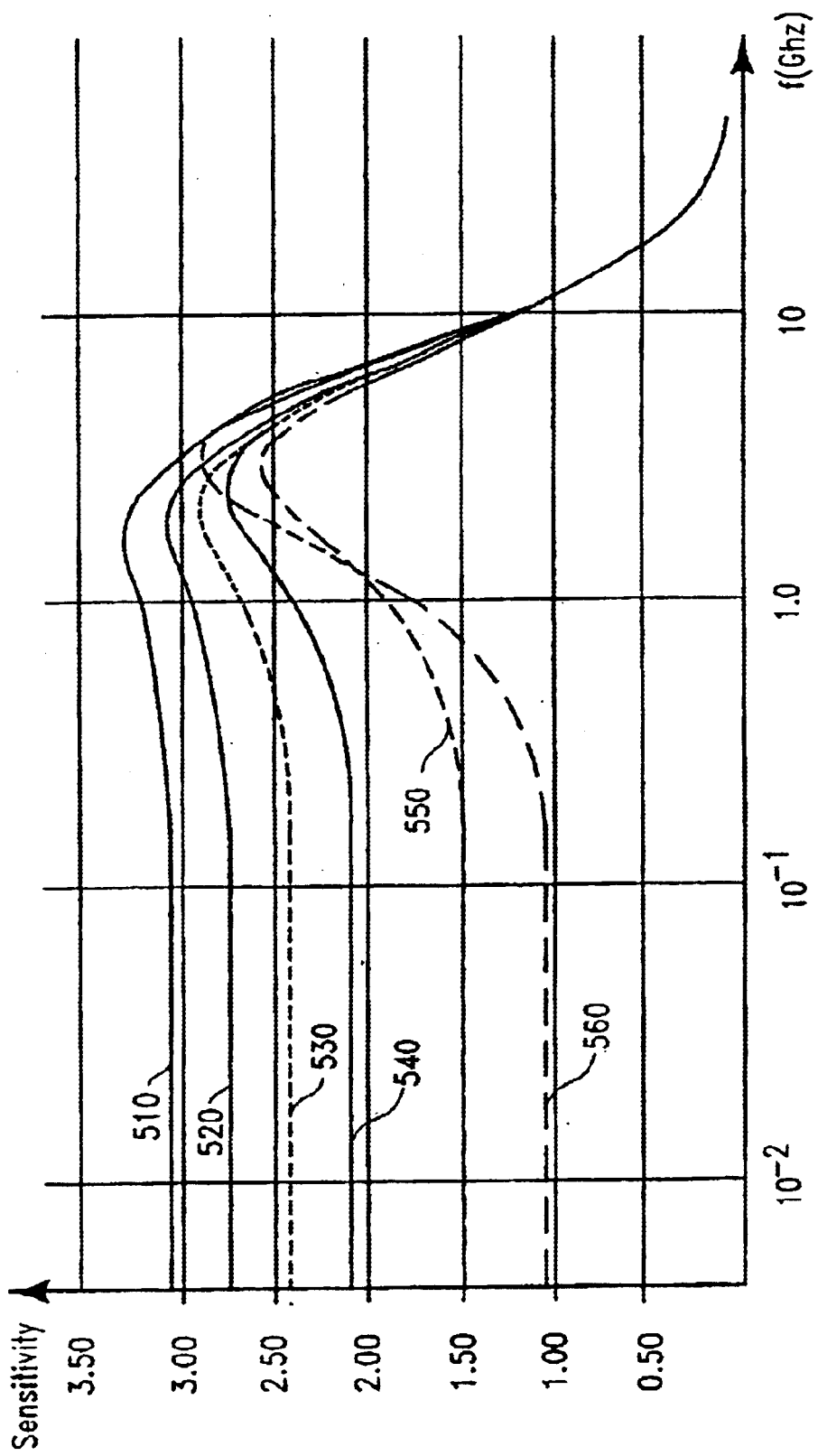
FIG. 4C is a graph of a mathematical simulation illustrating the sensitivity of a receiver according to the embodiment of FIG. 4A versus frequency, relative to different percentages of peaking at which a receiver is operated.

FIG. 4C includes a set of graphs representing a mathematical simulation of sensitivity of the receiver 40 versus frequency, for different peaking percentages. As described above relative to FIG. 4B, the percentage of peaking, which is controlled by the amount of current drawn by each of the peaking circuit 52 and non-peaking circuit 54, respectively, determines the frequency response of the receiver 40. Graph 510 of FIG. 4C represents the sensitivity of the receiver 40 when the peaking of the receiver 40 is operated at 50%, that is, the peaking circuit 52 draws 50% of the current drawn by tail transistors of the receiver 40, and the non-peaking circuit 54 draws 50% of the current. At that peaking level, the peak in receiver sensitivity at high frequency (3 GHz) is not pronounced in relation to the receiver sensitivity at lower frequencies, e.g. 0.5 GHz and below. High frequency peaking is more pronounced in relation to low frequency as the peaking percentage increases, as shown in curves 520 through 560. For example, curve 540 represents a peaking percentage of 69%, while curve 550 represents a peaking percentage of 81%, and curve 560 represents a peaking percentage of 100%. As apparent from FIG. 4C, higher peaking percentages lead to a sharper, more pronounced peaking characteristic, which is sharper in either magnitude, frequency or both.

Figure 5:
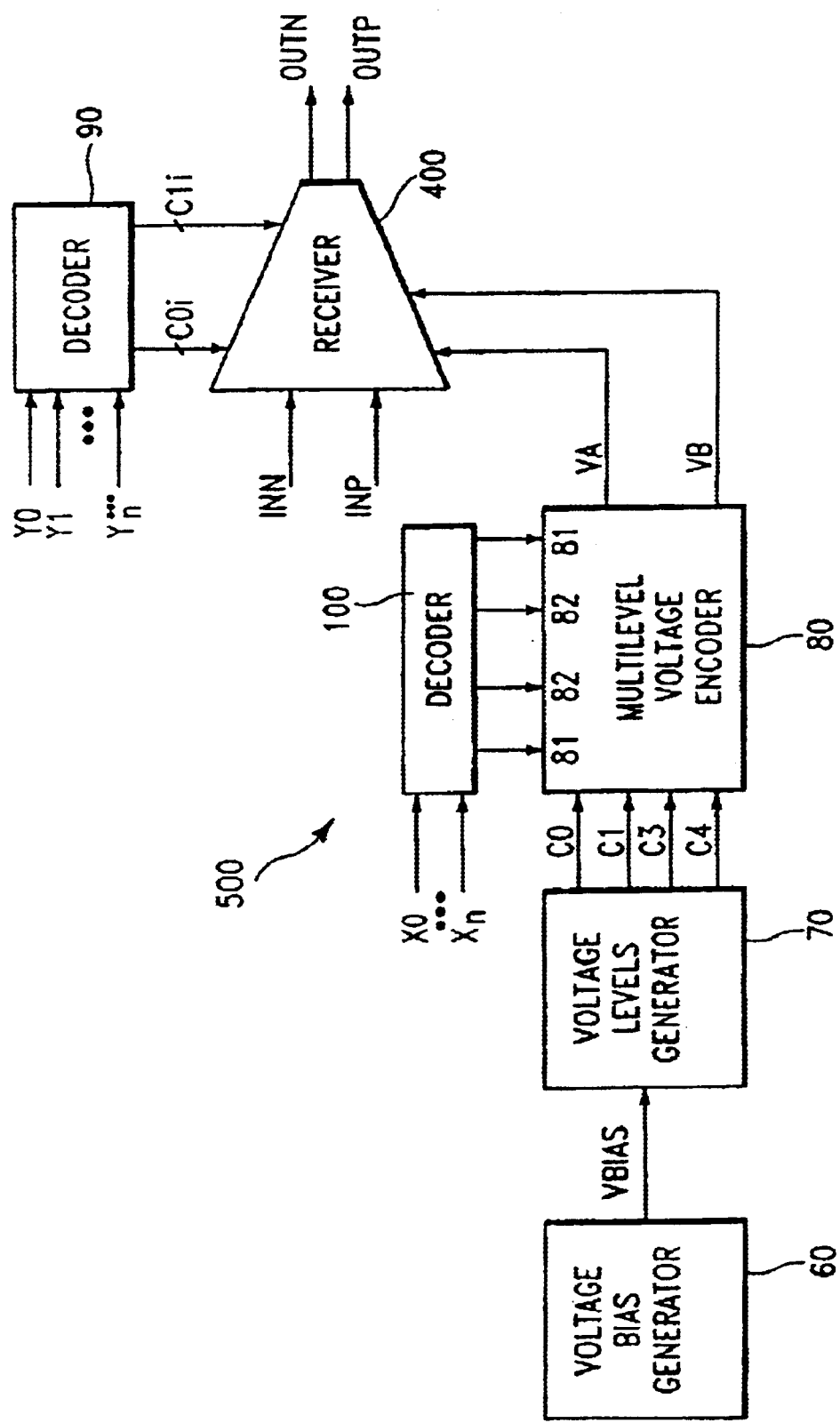
FIG. 5 is a block and schematic diagram illustrating a system embodiment for programmably controlling operation of a programmably adjustable peaking receiver according to FIG. 4A.

FIG. 5 is a block diagram illustrating a preferred embodiment of a receiver system 500 including a receiver 400, of the type shown as receiver 40 in FIG. 4A, in which peaking and non-peaking operation are programmably adjustable through control signals x0 . . . xn and y0â☐yn. Decoder 90 accepts a multi-bit input signal y0 â☐yn and decodes it to provide one or more sets of decoded one-of-many output signals C00 â☐C0n, and C10 â☐C1m. In such manner, multiple on/off signals C0i and C1i are provided from decoder 90 as control inputs to the adjustable impedance element 28 of the receiver 400 (See FIG. 3). Similarly, decoder 100 accepts a multi-bit input signal x0 â☐xn and decodes it to provide a set of decoded one-of-many output signals 81 â☐84. In such manner, multiple on/off signals 81 â☐84 are provided to multilevel voltage encoder 80 for controlling its operation.

Voltage bias generator 60, voltage levels generator 70, and multi-level voltage encoder 80 can be implemented in any of several ways. In a preferred embodiment, voltage bias generator 60 generates a steady bias voltage VBIAS that is compensated for changes in temperature and supply voltage. Voltage bias generator 60 can be implemented, for example, using a reference resistor and one or more current mirror devices. A bandgap reference generator may form a part of such voltage bias generator. The bias voltage VBIAS is input to a voltage levels generator 70, by which a plurality of different voltage levels C0, C1, C2, and C3 are generated and provided to a multi-level voltage encoder 80. In a preferred embodiment, the voltage levels generator 80 outputs a set of voltages C0, C1, C2, and C3, which are provided at the voltages of ground, X, 2X, and 4X, with X being the smallest unit difference in voltage. These voltages C0, C1, C2, and C3 are input to a multi-level voltage encoder 80, which, in turn, applies the decoded inputs 81, 82, 83, and 84 from decoder 100 to produce bias voltage outputs VA and VB at selected levels. Each selected level of VA and VB is determined as a combination of one or more of the different voltage levels C0, C1, C2, and C3 input to the multi-level voltage encoder 80. For example, when the voltage levels C0, C1, C2, and C3 have the levels ground, X, 2X, and 4X, the bias voltages VA and VB each have one of eight possible voltage levels from ground to 7X, depending upon the decoded input 81 â☐84 provided thereto. The output VA of the multilevel voltage encoder 80 is input to tail transistors T48 and T49 the receiver 400 (receiver 40 of FIG. 4A); while output VB is input to tail transistor T50 of receiver 400 (receiver 40 of FIG. 4A).

In operation, the degree to which the peaking function of the receiver 400 is utilized is selected by inputs x0 â☐xn provided to decoder 100. These inputs, after decoding, determine selected ones of many different voltage levels to provide the bias voltages VA and VB to the peaking circuit (52 of FIG. 4A) and the non-peaking circuit (54 of FIG. 4A) of receiver 400. Meanwhile, the operation of the peaking circuit 52 is determined by control inputs C0i (i=1 to n) and control inputs C1i (i=1 to m) to adjustable impedance element (48 of FIG. 4A), to determine the frequency and change in peak sensitivity of the peaking function of receiver 400.

Thus, by programmably adjusting the impedance of one or more adjustable impedance elements of a receiver, the peaking function of the receiver can be adjusted for particular conditions affecting reception, such as current operating conditions, e.g. transmission data rate, temperature, manufacturing variations, link characteristics, e.g. channel length, channel noise, impedance of the transmission medium, etc. Moreover, by placing a peaking circuit in parallel with a non-peaking circuit of a receiver, and controllably varying the magnitudes of the bias currents which operate the peaking and non-peaking circuits, the degree to which peaking is performed in the receiver is made controllable.

While the invention has been described with reference to certain preferred embodiments thereof, those skilled in the art will understand the many modifications and enhancements which can be made without departing from the true scope and spirit of the invention, as limited only by the appended claims.

What is claimed is:

1. An integrated circuit including a programmable peaking receiver, comprising:
    a pair of input transistors coupled to conduct differentially according to a pair of differential inputs applied to said pair of input transistors, each of said input transistors producing an output in accordance with said differential input applied thereto;
    a pair of tail transistors, coupled in current paths with said input transistors;
    a programmably adjustable impedance element coupled between current-conducting nodes of said tail transistors,
    wherein impedance of said programmably adjustable impedance element is adjustable in response to programming signal input to adjust a peaking function of said programmable peaking receiver.

2. The integrated circuit of claim 1 wherein said programmably adjustable impedance element is responsive to programming signal input applied according to conditions present in a communication system including said programmable peaking receiver to adjust said peaking function.

3. The integrated circuit of claim 2 wherein said programming signal input is applied on said integrated circuit.

4. The integrated circuit of claim 1 wherein said programmably adjustable impedance element includes an adjustable capacitive element.

5. The integrated circuit of claim 1 wherein said adjustable capacitive element comprises a microelectronic capacitor.

6. The integrated circuit of claim 1 wherein said programmably adjustable impedance element includes an adjustable resistive element.

7. The integrated circuit of claim 6 wherein said adjustable resistive element comprises a microelectronic resistor.

8. The integrated circuit of claim 1 wherein said programmably adjustable impedance element includes a plurality of circuit elements selected from the group consisting of at least fixed resistive elements, and fixed capacitive elements, and a corresponding set of switching devices adapted to receive a set of programming signals for coupling selected ones of said circuit elements to said current 9. An integrated circuit including a programmable peaking receiver, comprising:

a pair of input transistors;

a pair of tail transistors, coupled in current paths with said input transistors, said input transistors being operable to conduct differentially between respective output nodes and respective ones of said pair of tail transistors, according to a pair of differential signal inputs applied to said pair of input transistors; and a pair of programmably adjustable load impedance elements operatively connected to said output nodes wherein said programmably adjustable local impedance elements are adapted to be adjusted by programming signal inpout to adjust a peaking function of said programmable peaking receiver.

10. The integrated circuit of claim 9 wherein said programmably adjustable load impedance elements are adapted to be adjusted by programming signal input applied according to conditions present in a communication system including said programmable peaking receiver.

11. The integrated circuit of claim 10 wherein said programming signal input is applied on said integrated circuit.

12. The integrated circuit of claim 9 wherein said programmably adjustable load impedances include programmably adjustable inductive elements.

13. The integrated circuit of claim 9 further comprising a programmably adjustable impedance element coupled between current conducting nodes of said tail transistors.

14. The integrated circuit of claim 13 wherein said programmably adjustable impedance element includes a programmably adjustable capacitive element.

15. The integrated circuit of claim 13 wherein said programmably adjustable impedance element includes a programmably adjustable resistive element.

16. The integrated circuit of claim 13 wherein said programmably adjustable impedance element includes both a programmably adjustable capacitive element and a programmably adjustable resistive element.

17. The integrated circuit of claim 12 wherein each said programmably adjustable inductive element includes a fixed impedance inductor coupled in parallel with a capacitive element having a capacitance that is variable according to a voltage input thereto.

18. The integrated circuit of claim 17 wherein said capacitive element includes a first capacitor, connected in series with said voltage input, in series with a second capacitor.

19. The integrated circuit of claim 13 wherein said programmably adjustable impedance element includes a set of fixed impedances and a corresponding set of switching devices adapted to receive a set of programming signals for coupling selected ones of said fixed impedances to said current conducting nodes.

20. The integrated circuit of claim 13 wherein said programmably adjustable impedance element includes a plurality of circuit elements selected from the group consisting of at least fixed resistive elements, and, fixed capacitive elements and a corresponding set of switching devices responsive to a set of programming signals for coupling selected ones of said circuit elements to said current conducting nodes.

21. An integrated circuit including a receiver operable to receive a signal represented by a pair of differential signal inputs, said receiver comprising:

a first circuit coupled to of said differential signal inputs, said first circuit having a peaking function to increase a sensitivity of said receiver over a limited range of frequencies of said signal relative to at least one other range of said frequencies, said first circuit operable to vary a degree of said peaking function according to an amount of a first current drawn by said first circuit; and a second circuit coupled to each of said differential signal inputs, said second circuit controlled according to an amount of a second current drawn by said second circuit, whereby said degree of said peaking function of said receiver is adjustable by varying relative magnitudes of said amounts of said first current and said second current.

22. The integrated circuit of claim 21 wherein said second circuit is connected in parallel with said first circuit.

23. The integrated circuit of claim 22 wherein said first circuit and said second circuit are connected together at a pair of output nodes, said output nodes being coupled to a pair of load impedance elements coupled to conduct said first current and said second current.

24. The integrated circuit of claim 21 wherein said first circuit comprises:

a pair of input transistors coupled to conduct differentially according to said pair of differential signal inputs applied to said pair of input transistors, each of said input transistors producing an output in accordance with said differential signal input applied thereto;

a pair of tail transistors, coupled in current paths with said input transistors; and a programmably adjustable impedance element coupled between current- conducting nodes of said tail transistors, wherein an impedance of said programmably adjustable impedance element is adjustable in response to programming signal input to adjust said peaking function.

25. The integrated circuit of claim 24 wherein said programmably adjustable impedance element includes a programmably adjustable capacitive element.

26. The integrated circuit of claim 24 wherein said programmably adjustable impedance element includes a programmably adjustable resistive element.

27. A method of programmably adjusting a peaking function of a differential signal receiver, comprising:

inputting a pair of differential input signals to a pair of input transistors coupled to conduct currents differentially between a pair of load impedances and a pair of tail transistors; and programmably varying a shunt impedance of a shunt impedance element coupled between the tail transistors, said shunt impedance element including at least one of a programmably adjustable resistive element, and a programmably adjustable capacitive element, by varying a programming signal to adjust amounts of the current conducted over a peaking range of frequencies to programmably vary a degree of the peaking function of the differential signal receiver.

28. The method of claim 27 wherein the programming signal includes a plurality of switching signals adapted to control connection and disconnection of a plurality of impedance elements to and from the tail transistors, the impedance elements including the at least one of the programmably adjustable resistive element, and the programmably adjustable capacitive element.

29. The method of claim 27 wherein the shunt impedance is varied by varying the programming signal to the programmably adjustable resistive element.

30. The method of claim 27 wherein the shunt impedance is varied by varying the programming signal to the programmably adjustable capacitive element.

31. A method of programmably adjusting a peaking function of a differential signal receiver, comprising:

inputting a pair of differential signal inputs to a pair of input transistors coupled to conduct currents differentially between a pair of load impedances and a pair of tail transistors; and programmably varying load inductance components of the load impedances by varying a programming signal to programmably adjustable inductive elements contributing to the load inductance components, to adjust amounts of the currents conducted over a peaking range of frequencies to programmably vary a degree of the peaking function of the differential signal receiver.

* * * * *